United States Patent Office 3,677,784
Patented July 18, 1972

3,677,784
METHOD FOR PREPARING HYDROPHOBIC SILICA
Siegfried Nitzsche, Wolfgang Kaiser, Ernst Wohlfarth, and Paul Hittmair, Burghausen, Upper Bavaria, Germany, assignors to Wacker-Chemie G.m.b.H., Munich, Germany
No Drawing. Filed Jan. 21, 1970, Ser. No. 4,764
Claims priority, application Germany, Jan. 27, 1969, P 19 03 904.4
Int. Cl. C09c 3/00
U.S. Cl. 106—309                                   5 Claims

ABSTRACT OF THE DISCLOSURE

Hydrophobic silica filler for silicone rubber stocks can be prepared by reacting organohalogenosilanes with finely divided silica in an aqueous silicasol at a pH in the range from 8.0 to 10.8.

---

This invention relates to a method for preparing fillers for silicone rubber stocks. Such fillers are treated with organohalogenosilanes to render them hydrophobic.

The treated fillers having organosiloxy groups on the surface and employed in silicone rubber stocks have previously been prepared by reacting organosilicon compounds with various silicas in the form of water-free or essentially water-free powders or of gels. For example, the U.S. Pat. No. 3,464,950, issued Sept. 2, 1969, discloses that fume silicas prepared pyrogenically from the gas phase, which are fine powders and are essentially water-free unless water is added to them, can be reacted with organosilanols or organosiloxanols prior to or after dispersing the silica in a silicone rubber stock. The resulting silicone rubber exhibits good physical properties. However, the silica fillers so treated exhibit a thickening effect on the silicone rubber stock, hence, low viscosity stocks suitable for pouring and brushing cannot be prepared employing such fillers or can only be prepared by concurrent use of an organic solvent. Furthermore, the fillers treated in accordance with U.S. Pat. No. 3,464,950 have not been useful in room temperature vulcanizing (RTV) silicone rubber stocks wherein the cure mechanism is based on the presence of alkoxysilanes or alkoxysiloxanes as crosslinking agents and condensation catalysts such as metal salts as crosslinking catalysts. The treated fillers appear to inhibit the desired cure in such systems.

Another known method for treating silicas for use in silicone rubber stocks is shown in U.S. Pat. No. 3,122,520, issued Feb. 25, 1964. The method of said patent comprises converting a silica hydrosol into a hydrogel by heating an acid silica hydrosol, mixing the hydrogel with an organosilicon treating agent in the presence of a strong acid catalyst in an organic solvent to convert the hydrogel to an organogel and removing the organic solvent. This is an expensive procedure because of the several steps and stages required and it is difficult to prepare treated silicas having the desired surface area characteristics employing said method.

It is an object of the present invention to avoid the difficulties noted above and introduce a novel method for preparing hydrophobic silica for use in silicone rubber stocks. A simple and efficient system for treating silica fillers is also an object. A further object is a treated silica which can be incorporated in silicone rubber stocks of low viscosity to produce pourable and brushable compositions free of organic solvent. Other objects and advantages of this invention are detailed in or will be apparent from the disclosure and claims following.

This invention is a method for treating silicas to produce hydrophobic silica comprising reacting a finely divided silica with an organohalogenosilane employing an aqueous silicasol at a pH of 8.0 to 10.8 at 25° C. as the silica.

The surface area of the fillers prepared in accordance with this invention is in the range from 50 to 100 square meters per gram in contrast to the higher surface area fillers (i.e. 150 to 480 square meters per gram) achieved in accordance with U.S. Pat. No. 3,464,950 and those according to U.S. Pat. No. 3,122,520 having a surface area in the range from 150 to 476 square meters per gram in the examples thereof. However, the treated fillers of this invention provide excellent reinforcement for the ultimate rubber products as shown by the high tear strength and continuing tear resistance exhibited by such rubber. These physical strength advantages are achieved even when the silicone rubber stock is a low viscosity, pourable and brushable material based on relatively low molecular weight siloxane polymers.

The method of this invention involves reacting an aqueous silicasol with an organohalogenosilane rather than a silica gel as previously described in the art. The aqueous silicasol is a water dispersion of colloidal silica particles and it is preferred to employ sols wherein the silica particles are 7 to 30 millimicrons, most preferably 20 to 30 millimicrons, in diameter. The silicon content of the silicasols, calculated as $SiO_2$, is preferably 5 to 50% by weight based on the total weight of the silicasols which are used. Such sols are readily prepared by methods well known in the art and are commercially available under such registered trademarks as "Ludox" and "Siligen." The silicasols having silica diameters of 20 to 30 millimicrons give excellent results because good pouring and brushing materials (i.e. low viscosity siloxane polymer-filler mixtures) and excellent physical strengths in the ultimate rubber can be achieved with such sols.

If the pH of the silicasols is beneath 8.0 at 25° C., the hydrophobic fillers which are prepared herewith will result in organopolysiloxane elastomers with poorer mechanical resistance properties. The silicasols with the pH above 10.8 are not known.

The organohalogensilanes which may be used for the method of the present invention are the same as those which have hitherto been used for reacting finely divided silica with organohalogensilanes for the preparation of hydrophobic fillers for silicone rubber stocks. This includes especially compounds of the general formula $R_nSiX_{4-n}$ wherein the R radicals are aliphatic hydrocarbon radicals with 1 to 5 carbon atoms, phenyl radicals or $R'CH_2CH_2$ radicals ($R'$=perfluoroalkyl radicals with 1 to 3 carbon atoms), X is a halogen atom, especially chlorine, and $n$ is 2 or 3. The best results are obtained when $n$ is 3. R is preferably a methyl radical since it is especially easily obtainable and especially excellent results are obtained with it, so that in the present invention trimethylchlorosilane is the preferred organohalogensilane. Further examples for the organohalogensilanes which can be used in the method of the present invention are vinyldimethylchlorosilane, as well as diethyldichlorosilane, allylmethyldichlorosilane, methylphenyldichlorosilane, diphenyldichorosilane, phenylethyldichlorosilane, 3,3,3-trifluoropropylmethyldichlorosilane, pentylmethyldichlorosilane, divinyldichlorosilane and trivinylchlorosilane. Mixtures of various organohalogensilanes can be used.

The organohalogensilanes are preferably incorporated in quantities of 0.5 to 3 kg. per liter of silicasol.

The reaction is preferably carried out at temperatures in the range 10° to 80° C.

According to the preferred execution, the method of the present invention is carried out in such a manner that an aqueous silicasol having a pH of 8.0 to 10.8 is allowed to flow into an organohalogensilane which can be dissolved in an inert solvent, the organic phase is separated from the aqueous phase, for example, by centrifuging, and the volatile components are removed from the organic phase, for example, by vaporizing.

Examples of inert solvents in which the organohalogensilanes can be dissolved are aliphatic hydrocarbons such as petroleum ether, that is, essentially mixtures consisting of pentane and hexane of saturated aliphatic hydrocarbon; aromatic hydrocarbons such as benzene, toluene and xylene; ethers such as diethylether; ketones such as acetone; and chlorohydrocarbons such as trichloroethylene, chloroform and carbontetrachloride.

If inert solvents are used together with the method of the present invention, they are expediently incorporated in quantities of 100 to 400% by weight calculated on the weight of the silanes. Obviously, however, the quantity of the solvent is not critical.

All those diorganopolysiloxanes which hitherto have been or could have been used as the basis for materials which are hardenable to organopolysiloxane elastomers can also be used as the diorganopolysiloxanes which form the basis of these materials which are hardenable to elastomers.

At least the preponderant portion of the SiC-bonded organic radicals in these organopolysiloxanes consists preferably of methyl radicals primarily because of their ready availability, the remaining SiC-bonded radicals which can be present, if desired, are especially vinyl and phenyl radicals. As can be inferred from the statements at the beginning, however, the best advantages are obtained if those fillers prepared according to the present invention are used for the preparation of diorganopolysiloxane based materials which are curable to elastomers, which can be poured or brushed without the concurrent use of solvents. The viscosity of the diorganopolysiloxanes in the materials which can be cured to elastomers containing fillers prepared according to the present invention should, therefore, not exceed 200,000 cs./25° C. and preferably below 50,000 cs./25° C.

Since the best physical properties are obtained therewith, the fillers prepared according to the present invention are incorporated in quantities of 5 to 50% by weight calculated on the total weight of the diorganopolysiloxane based materials which are curable to elastomers.

The curing of these diorganopolysiloxanes to elastomers can be carried out according to all suitable methods, of which a great many are known. For example and preferably, the curing can be carried out with curing agents which are effective at room temperature, for instance, combinations of alkylsilicates and alkylpolysilicates such as methylorthosilicate, hexaethoxydisiloxane and ethylpolysilicate, organoalkoxysilanes such as methyltriethoxysilanes, polyorganoalkoxysilanes such as partial hydrolyzates of methyltriethoxysilanes and organosiloxanes having an average of at least three Si-bonded hydrogen atoms per molecule such as methylhydrogenpolysiloxane and condensation catalyst such as salts of carboxylic acids and metals or organometals such as lead-2-ethylhexoate and dibutyltindilaurate or triaceloxyorganosilanes such as methyltriacetoxysilane, optionally also in combinations with condensation catalyst, trioximesilicon compounds, triaminosilicon compounds such as methyltris(cyclohexylaminosilane) and 1,1,1 - trimethyl-3,3,3-tris(cyclohexylamino)disiloxane. If such curing procedures are used, the diorganopolysiloxanes must display Si-bonded condensable groups such as hydroxyl groups especially in the terminal unit. The presence of such condensable groups is not necessary, however, if for instance, the diorganopolysiloxanes contain vinyl groups. The room temperature curing can then be carried out, for instance, with organosiloxanes having an average of at least 3 Si-bonded hydrogen atoms per molecule and platinum catalysts for instance, chloroplatinic acid and similar known Pt complexes. If desired, the curing can be accelerated by heating. Finally, polycyclic diorganopolysiloxanes can be cured in the presence of equilibration catalysts.

Obviously, the silicone rubber stocks which are diorganopolysiloxane based materials which are hardenable to elastomers can contain other materials which are known for use in silicone rubber stocks in addition to the diorganopolysiloxanes and the fillers prepared according to the present invention. Examples of such materials are fillers with a surface size beneath 50 m.$^2$/g., for instance, quartz flour, titaniumdioxide, the so-called molecular sieves such as calcium aluminum silicate, diatomaceous earth, zirconium silicate and calcium carbonate, fibrous fillers such as asbestos, glass fibers or organic fibers, pigments, soluble dyes, aromatics, corrosion inhibitors, materials which will stabilize the masses against the influence of water such as acetic acid anhydride, materials which will slow down the curing, such as benzotriazol and softeners such as trimethylsiloxy endblocked dimethylpolysiloxanes.

In the following examples, the tear strength was measured according to DIN 53,515. The examples are intended to assist those skilled in the art to better understand and practice this invention and do not delineate the scope of the invention.

EXAMPLE 1

(a) 657 g. trimethylchlorosilane dissolved in 1.5 liters benzene was heated in a bath at 55° C. under the exclusion of moisture. The bath was removed and 472.5 ml. of an aqueous silicasol (diameter of the silica particles is about 25 millimicrons, pH 10.0 at 25° C., silicon compound content calculated as $SiO_2$ 22% by weight calculated on the total weight of the silicasol) was allowed to run into the solution within a period of about 20 minutes while stirring vigorously. After the silicasol addition had terminated, it was stirred for two more hours at room temperature whereupon the organic phase was removed by centrifuging, filtered and freed of volatile materials at a bath temperature of 100° C., first at atmospheric pressure, i.e. normal pressure, and then at 10 mm. Hg (abs.). 96 grams of a product was obtained which falls into a powder upon light pressure. It had a BET surface (cf. Brunauer, Emmet and Teller in "Journal of the American Chemical Society," vol. 60, p. 309) of 90 m.$^2$/g.

(b) 60 g. of this powder was mixed with 140 g. of a dimethylpolysiloxane having 1 Si-bonded hydroxyl group in each terminal unit and a viscosity of 15,000 cs./25° C. An easily brushable material was obtained. Into 100 g. of this material, 4 milliliters of a mixture of 3 parts by volume hexaethoxydisiloxane and 1 part by volume dibutyltindilaurate was stirred. The mixture thus obtained was brushed onto a polished steel plate to a depth of about 2 millimeters. After 3 days at room temperature, the elastomer foil thus obtained was removed from the substrate. It displayed the following properties: tensile strength 37 kg./cm.$^2$; elongation at break 650%; tear strength 18.7 kg./cm.

(c) Into the remaining 100 g. of the material which was prepared as given under (b) by mixing 60 g. of the powder whose preparation was described under (a) with 140 g. of a dimethylpolysiloxane having 15,000 cs./25° C., 5.5 ml. of methyltriacetoxysilane was stirred. The mixture thus obtained was storable under exclusion of water and was brushed onto a polished steel plate in a film about 1.8 mm. thick. The plate had a thin film of Vaseline as parting agent. After standing for 3 days at room temperature in the air, the elastomer foil thus obtained was removed from the substrate. It displayed the following properties: tensile strength 36 kg./cm.$^2$; elongation at break 680%; tear strength 18.9 kg./cm.

(d) Another 60 g. of a powder whose preparation was described under (a) was mixed with 140 g. of a dimethylpolysiloxane with vinyldimethylsiloxy units as the terminal units and a viscosity of 23,000 cs./25° C. Into 100 g. of this material, 3 mg. Pt in the form of the solution of platinum-ethylenedichloride $(C_2H_4 \cdot PtCl_2)_2$ in benzene and 10 g. of a methylhydrogenpolysiloxane contain 0.3% by weight of Si-bonded hydrogen were stirred. The mixture thus obtained was applied to a polished steel plate having a thin film of Vaseline as a parting agent in a film 1.5 mm. thick. The film was cured to an elastomer by 6 hours of heating in an air circulating oven at 70° C. The foil was removed and after 3 days at room temperature showed the following properties: tensile strength 40 kg./cm.$^2$; elongation at break 590%; tear strength 19.4 kg./cm.

EXAMPLE 2

Equivalent results were obtained when Example 1 was repeated employing a chemically equivalent amount of each of the following for the 657 g. of trimethylchlorosilane in Example 1(a): triethylchlorosilane, trimethylbromosilane, trimethylfluorosilane, trimethyliodosilane, dimethyldichlorosilane, allylmethyldichlorosilane, methylphenyldichlorosilane, diphenyldichlorosilane, phenylethyldichlorosilane, 3,3,3 - trifluoropropylmethyldichlorosilane, pentylmethyldichlorosilane, divinyldichlorosilane and trivinylchlorosilane.

EXAMPLE 3

Equivalent results were achieved when Example 1 was repeated employing a silicasol having particles on an average diameter of 15 millimicrons and one having an average particle diameter of 30 millimicrons.

That which is claimed is:
1. A method of preparing hydrophobic fillers for silicone rubber stocks by reacting an organohalogensilane with an aqueous silicasol having a pH value of 8.0 to 10.8 wherein the aqueous silicasol is allowed to run into an organohalogensilane dissolved in an organic solvent, the aqueous phase is separated from the organic phase and the volatile components are removed from the organic phase.

2. The method of claim 1 wherein the organohalogenosilane is of the general formula $R_nSiX_{4-n}$ where each R is an aliphatic hydrocarbon radical of less than 6 carbon atoms, a phenyl radical or a perfluoroalkylethyl radical of 3 to 5 carbon atoms, $n$ is 2 or 3 and X is a halogen atom.

3. The method of claim 1 wherein R is $CH_3$ and X is Cl.

4. The method of claim 1 wherein the silicasol has a particle size in the range 7 to 30 millimicrons.

5. The method of claim 4 wherein the silicon content of the silicasol calculated as $SiO_2$ is from 5 to 50% by weight based on the total weight of the silicasol.

References Cited
UNITED STATES PATENTS

| | | | |
|---|---|---|---|
| 2,886,460 | 5/1959 | Iler et al. | 106—308 |
| 2,900,348 | 8/1959 | Simpson et al. | 252—313 |
| 3,122,520 | 2/1964 | Lentz | 260—46.5 |

TOBIAS E. LEVOW, Primary Examiner

J. V. HOWARD, Assistant Examiner

U.S. Cl. X.R.

106—288 B, 308 Q; 260—37; 117—123, 161